United States Patent [19]

Rawlings

[11] 4,026,400
[45] May 31, 1977

[54] DUAL FRICTION CLUTCH

[75] Inventor: Dennis George Rawlings, Leamington Spa, England

[73] Assignee: Automotive Products Company Limited, England

[22] Filed: Mar. 2, 1976

[21] Appl. No.: 663,244

[30] Foreign Application Priority Data
Mar. 5, 1975 United Kingdom ............... 9050/75

[52] U.S. Cl. .......................... 192/99 A; 192/70.29; 192/48.91
[51] Int. Cl.² .......................................... F16D 13/26
[58] Field of Search ............ 192/99 A, 70.29, 70.3, 192/48.8, 48.91

[56] References Cited
UNITED STATES PATENTS
3,590,968  7/1971  Binder .............................. 192/99 A
3,779,353  12/1973  Maucher ........................ 192/70.29

Primary Examiner—Benjamin W. Wyche
Attorney, Agent, or Firm—Lawrence J. Winter

[57] ABSTRACT

A dual clutch, e.g. for agricultural tractors having separate wheel and power take off drives, has a driving plate spaced from a flywheel with two pressure plates interposed. A single Belleville spring clamps one driven plate between one pressure plate and the flywheel and the other driven plate between the other pressure plate and the driving plate. A plurality of release levers pivot on the driving plate to each operate the one pressure plate through a link and the other pressure plate through an adjustable toggle mechanism. The driven plates may drive the same shaft.

7 Claims, 4 Drawing Figures

DUAL FRICTION CLUTCH

The invention relates to clutches having two driven plates. It particularly relates to so-called dual clutches in which each driven plate is adapted to drive a separate shaft, e.g. the main vehicle drive and the power take off drive of an agricultural type tractor. However, it also relates to twinplate clutches where each driven plate is adapted to drive the same shaft.

It is an object of the invention to provide a friction clutch having two driven plates and having an improved release mechanism.

According to the invention a friction clutch comprises a flywheel having a driving plate attached, first and second driving surfaces on the flywheel and driving plate respectively, the driving surfaces facing each other, a first pressure plate interposed between the flywheel and the driving plate and a second pressure plate interposed between the driving plate and the first pressure plate, a first driven plate interposed between the first driving surface and the first pressure plate and a second driven plate interposed between the second driving surface and the second pressure plate, spring means between the pressure plates for clamping the driven plates, and a plurality of release mechanisms, each release mechanism comprising a lever, pivoting on the driving plate about a respective first pivot axis, a first link, pivoting on the lever about a respective second pivot axis, an abutment on the first link to contact adjustment means on the lever to move the first link with the lever when the lever is pivoted in one direction; an abutment member, pivoting on the first link about a respective third pivot axis parallel to the first pivot axis connecting the second pressure plate to the lever to move the second pressure plate away from the second driving surface when the lever is pivoted in said one direction, a second link connecting the first pressure plate to the lever to move the first pressure plate away from the flywheel when the lever is pivoted in said one direction, and means on the lever for engagement with a clutch release bearing for moving the lever in said one direction.

Preferably said first and second pivot axes in each release mechanism are coincident, in which case the respective link and lever may be connected to the driving plate by a single pivot pin. The abutment member may comprise a third link or a roller. The adjustable abutment may comprise a setscrew. Conveniently the spring means comprise a single belleville spring.

To reduce the effort required to maintain the release of the second plate the geometry of the release mechanisms is preferably arranged so that each of said third axes lies in a plane which is nearer said second driving surface than a plane containing each of said first axes.

The invention will now be described by way of example with reference to the accompanying drawings, in which FIG. 1 is an end elevation of one embodiment of a dual clutch assembly according to the invention.

Figure 1:
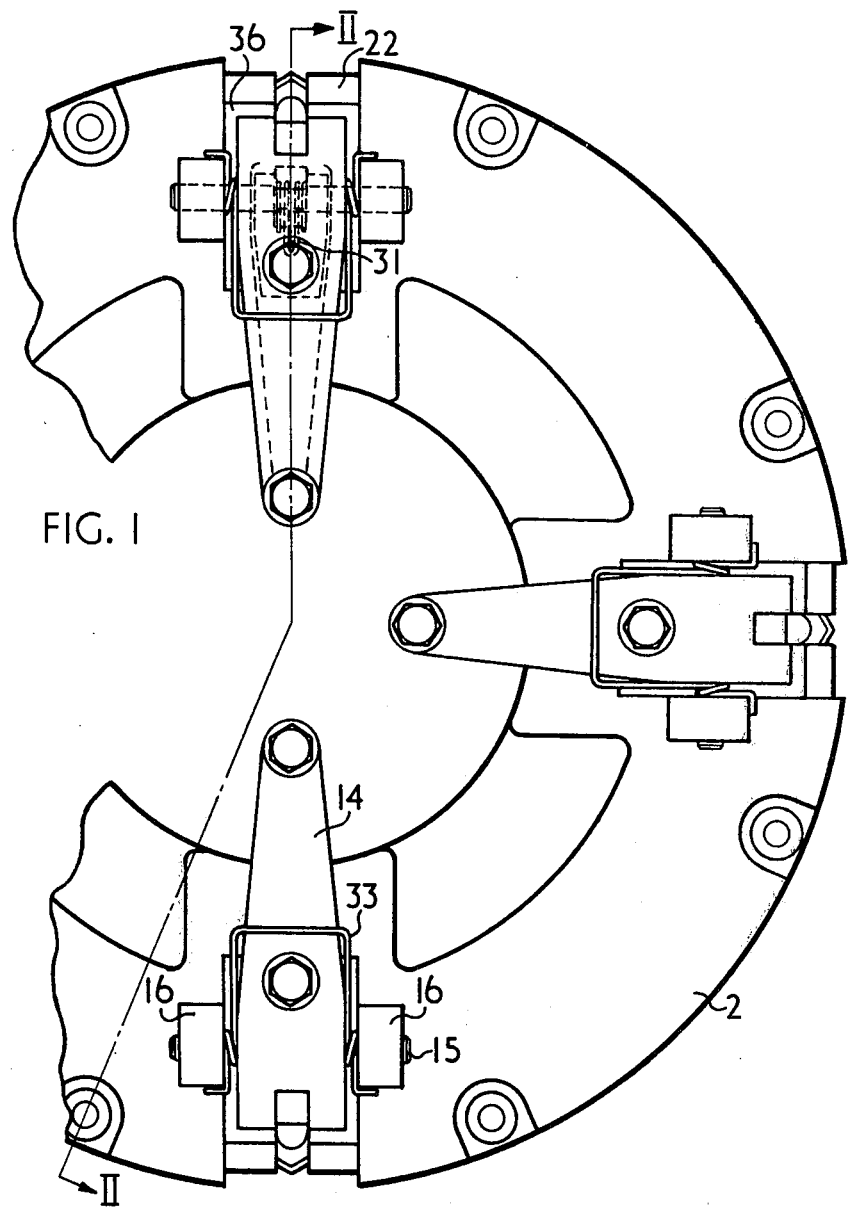
Figure 2:
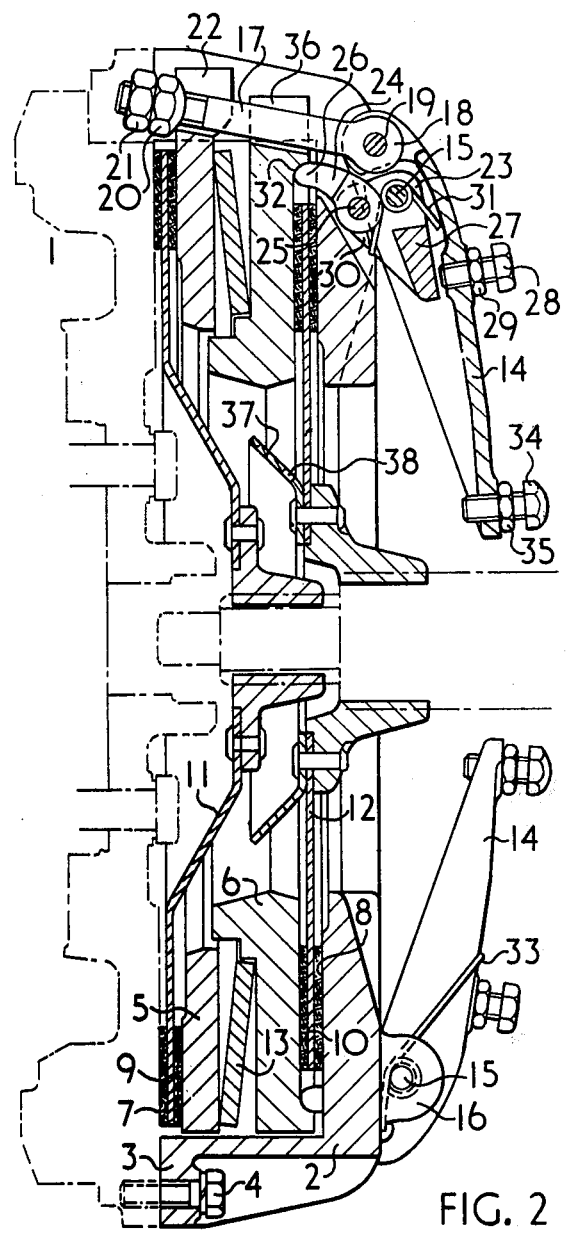
FIG. 2 is a section along the line II — II of the assembly shown in FIG. 1 with certain parts shown rotated about the axis of the clutch from their true positions.

Referring to FIGS. 1 and 2, a clutch driving plate 2 is adapted to be driven by an engine flywheel 1. The driving plate 2 has a dished flange 3 and is secured to the flywheel 1 by eight circumferentially spaced bolts 4. A pair of pressure plates 5, 6 is located between friction driving surfaces 7, 8 machined on the flywheel 1 and cover plate 2 respectively, the pressure plate 5 which is adjacent to the flywheel driving surface 7 having a friction engaging surface 9 and the pressure plate 6 which is adjacent to the driving surface 8 having a friction engaging surface 10.

The pressure plate 5 is supported for rotational movement with the flywheel 1 by four lugs 22 which engage with four slots machined in the dished flange 3 of the driving plate 2. Similar lugs 36 on the pressure plate 6 engage with the same four slots to support the pressure plate 6 for rotational movement with the flywheel.

In an agricultural tractor the clutch is arranged to drive co-axial input shafts of the main drive and power take off gearbox. A driven plate 11 is interposed between the flywheel driving surface 7 and the engaging surface 9 of the adjacent pressure plate 5 and is supported for rotation with the inner gearbox input shaft. Another driven plate 12 is interposed between the driving surface 8 and the engaging surface 10 of the adjacent pressure plate 6 and is supported for rotation with the outer gearbox input shaft. A Belleville spring 13 acts on each pressure plate 5, 6 to exert a clamping load on each driven plate 11, 12.

Four release mechanisms each comprise a lever 14 pivotably connected to the cover plate 2 by a pin 15 which passes through holes in the lever 14 and through holes in a respective pair of lugs 16 formed integrally with the cover plate 2 to flank the lever 14. The four slots in the dished flange 3 are carried into the main body of the cover plate 2 to provide clearance for the levers 14. Each lever 14 is operably connected to the pressure plate 5 which is further from the lever pivot axis, i.e. the axis of pin 15, by a link 17. The link 17 has an eye end 18 received in a slot in the end of lever 14 and is pivotably connected to lever 14 by a pin 19. At the other end, the link 17 is threaded to take a domed nut 20 and locknut 21.

Each of the four radial lugs 22 of pressure plate 5 is slotted to receive the shank of the link 17 and has a part-spherical recess for the domed nut 20. Thus each domed nut 20 and its associated part-spherical recess form a pivotal connection of each link 17 with the pressure plate 5. Each of the four radial lugs 36 of pressure plate 6 is slotted to give clearance for the links 17.

Each lever 14 is of generally U-shaped cross-section to form a recess into which is received a respective bifurcated link 23 which pivots on the same pin 15 as the lever 14. An abutment member constituted by a second link 24 is positioned between the arms of link 23, pivots on a pin 25 and has a radiussed nose 26 which engages the pressure plate 6 at the outer periphery of a recess 32 formed by the friction engaging surface 10. A bridge portion 27 joining the arms of link 23 acts as an abutment by which the link 23 engages the lever 14 through an adjustment formed by a setscrew 28 and a locknut 29.

The link 24 has another nose portion 30 which engages one pair of arms of a double hairpin spring 31 (see ghosted detail in FIG. 1), the other pair of arms engaging the bottom of the recess formed in lever 14. A slot in the link 24 provides clearance for the hairpin spring 31 so that only the nose 30 engages. The hairpin spring 31 exerts a biassing load on the link to maintain the radiussed nose 26 in contact with the outer periphery of the recess 32 and through the reaction on pin 25 exerts a biassing load to urge the bifurcated link 23 in the same rotational direction.

Another hairpin spring 33 acts between each lever 14 and the cover plate 2 to urge the lever 14 in the same rotational direction as links 23 and 24, the torque applied to the lever 14 by hairpin spring 33 being greater than the torque applied in the opposite direction by the reaction of hairpin spring 31.

The radially inner end of each lever 14 carries means for engagement with a clutch release bearing (not shown) which encircles the co-axial gearbox input shafts, the means comprising a setscrew 34 with a locknut 35. The head of each setscrew 34 is domed for smooth engagement with the co-operating release bearing component.

The position of each lever 14 is set by adjustment of the domed nut 20 and locknut 21 on the link 17, the action of hairpin spring 33 ensuring that the domed nut 20 remains in contact with the part-spherical recess formed in lug 22. A clearance is arranged between the abutment of each link bridge portion 27 and the associated setscrew 28 and setscrews 34 are adjusted so that in use the release levers 14 will all move in unison in response to movement of the release bearing.

The clutch is shown in the fully engaged position with each driven plate 11, 12 gripped between an associated friction driving surface and a friction engaging surface. Initial movement of the clutch release bearing in the clutch disengaging direction (towards the flywheel) causes the levers to pivot so that the ends carrying setscrews 34 move towards the flywheel and the ends carrying pins 19 move away from the flywheel. Such movement of pins 19 causes the links 17 to lift the pressure plate 5 away from the flywheel against the load of Belleville spring 13 and thus releases the clamping load on the driven plate 11. This initial movement takes place without movement of the links 23 or 24, but takes up the clearance between setscrews 28 and the link bridge portions 27.

Further movement of the clutch release bearing causes the bifurcated links 23 to pivot with the levers 14 and the pressure plate 6 to be pushed by the links 24 towards the flywheel against the load of the Belleville spring 13 and thus releases the clamping load on the driven plate 12. This further movement of the release bearing is accompanied by further movement of the pressure plate 5 away from the flywheel but this is not operationally significant since the clamping load on driven plate 11 is already released.

In a typical installation on an agricultural type tractor the inner gearbox shaft (connected to the driven plate 11) is for the main vehicle drive and the outer gearbox input shaft (connected to driven plate 12) is for the power take off. Thus the driver can de-clutch in two stages of clutch pedal movement, the first stage declutching the main vehicle drive with the power take off still clutched in and the second stage de-clutching the power take off with the main drive remaining declutched.

The geometrical relationship of the axis of pivot pins 15, 25 and radiussed nose 26 is such that the mechanical advantage between the levers 14 and pressure plate 6 increases with clutch disengaging movement of the release bearing. This, helped by the load/deflection characteristics of the Belleville spring, allows the driver to use a relatively low pedal pressure to keep both drives de-clutched but helps to avoid an "over-centre" feel; when he clutches in the main vehicle drive. A similar effect may be obtained in a further embodiment of the invention if each link 24 is replaced by a roller which also pivots on pin 25 and engages the driven plate lug at its outer periphery. The geometrical requirements are that in the clutch engaged position the axes of pivot pins 25 lie in a plane which is nearer the associated pressure plate than the plane containing the axes of pivot pins 15. Slight modifications to the components shown in FIG. 1 and FIG. 2 may be required in order to avoid fouling the driven plate 12 if the links 25 are replaced by rollers. For example, the axis of pivot pin 15 may be moved radially outwards with respect to the flywheel axis.

Figure 3:
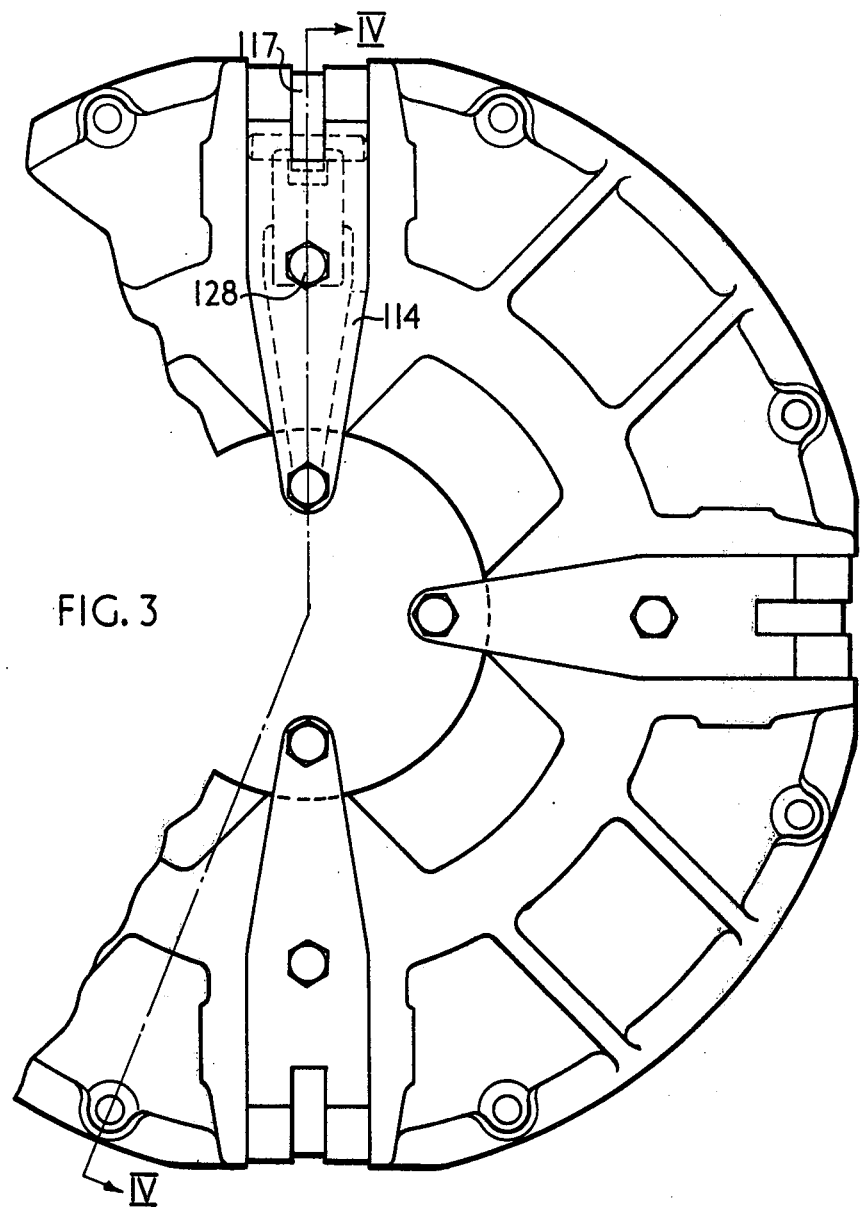
FIG. 3 is an end elevation of another embodiment of a dual clutch assembly according to the invention.
Figure 4:
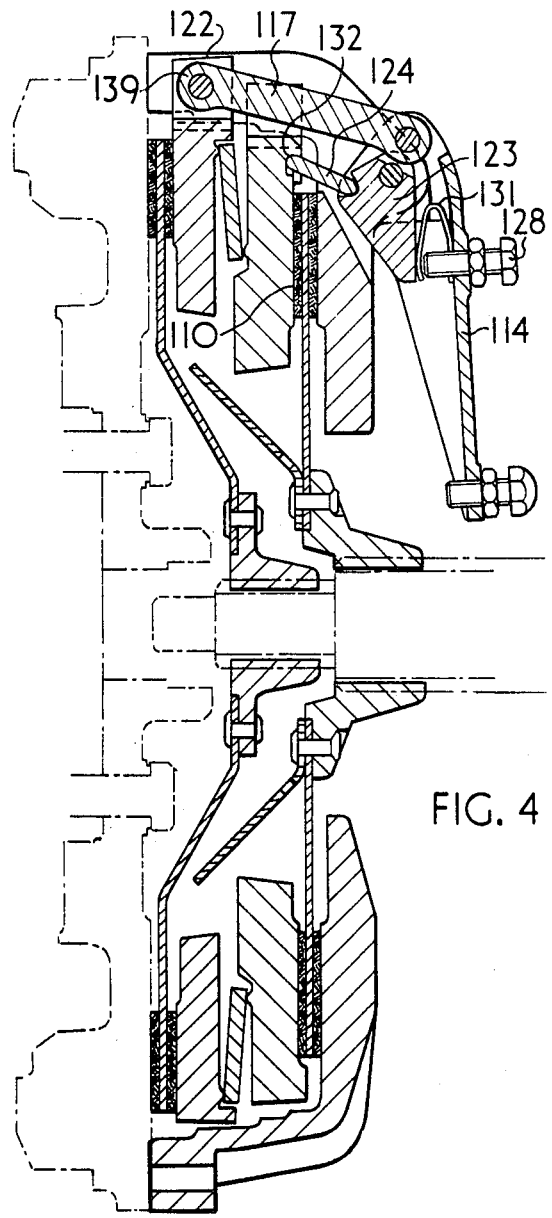
FIG. 4 is a section along the line IV — IV of the assembly shown in FIG. 3.

FIGS. 3 and 4 show a clutch which is a modification to that shown in FIGS. 1 and 2 and operates in a similar manner. It will be described below only in respect of features which differ from those shown in FIGS. 1 and 2.

The link 24 is replaced by a straight link 124 one end of which pivotably engages a straight recess 132 which is tangental to the outer peripheral edge of the friction engaging surface 110. The other end of link 124 pivotably engages a straight recess in a link 123 which replaces the bifurcated link 23. Link 124 is located laterally by the flanks of lever 114 which differs only in detail from lever 14. A double hairpin spring 131 replaces double hairpin spring 31 and is located by setscrew 128.

A link 117 which replaces link 17 has an eye end 139 which replaces the arrangement of domed nut 20 and locknut 21 and is pivotably pinned to the pressure plate lug 122.

In the installations described, the clutch is of the so-called wet type, i.e. lubricated by oil. An oil pump is driven from the outer gearbox input shaft (power take off) and delivers oil through ducts between the two input shafts into the space between the two driven plates 11, 12. A dished deflector plate 37 with holes 38 distributes the oil between the two driven plates which are apertured to allow oil to reach both sides of the friction linings. Excess oil is pumped from a bell housing which surrounds the clutch by the scooping action of the rotating flywheel and cover plate, the oil being deposited into a trough or pipe on the side of the bell housing and returning to the gearbox sump by gravity. Utilising the power take off to drive the oil pump ensures that a full flow of oil is present when the main drive clutch is engaged.

For a twin plate clutch installation each driven plate is connected to the same shaft and the clutch is adjusted so that both driven plates are released more or less simultaneously. For some applications of the dual clutch the release mechanism may be adjusted to release the driven plate 12 before driven plate 11.

I claim:
1. A friction clutch comprising:
a flywheel having a first driving surface thereon;
a driving plate attached to the flywheel and having a second driving surface thereon facing said first driving surface;
a first pressure plate interposed between the flywheel and the driving plate and supported for rotation with the flywheel;

a second pressure plate interposed between the driving plate and said first pressure plate and supported for rotation with the flywheel;

a first driven plate interposed between said first driving surface and said first pressure plate;

a second driven plate interposed between said second driving surface and said second pressure plate;

spring means interposed between said first and second pressure plates and acting on each of said pressure plates to exert a clamping load on each driven plate;

and a plurality of release mechanisms, each release mechanism comprising:

a lever, pivotably connected to the driving plate about a respective first pivot axis on the other side of the driving plate to said first driving surface;

a first link, pivotably connected to the lever about a respective second pivot axis;

an abutment on said first link;

adjustment means on the lever to contact said abutment to move said first link with the lever when the lever is pivoted in one direction;

an abutment member, pivotably connected to said first link about a respective third pivot axis parallel to said first pivot axis and operably connected to said second pressure plate to move said second pressure plate away from said second driving surface when the lever is pivoted in said one direction;

a second link operatively connected to the lever and said first pressure plate to move said first pressure plate away from said flywheel when the lever is pivoted in said one direction;

and means on the lever for engagement with a clutch release bearing which is operable to rotate said lever in said one direction.

2. The friction clutch of claim 1 wherein said first and second pivot axes in each release mechanism are coincident.

3. The friction clutch of claim 2 wherein each release mechanism comprises a single pivot pin which connects said first link and said lever to said driving plate.

4. The friction clutch of claim 1 wherein said abutment member comprises a third link.

5. The friction clutch of claim 1 wherein said adjustable abutment comprises a setscrew.

6. The friction clutch of claim 1 wherein each of said third axes lies in a plane which is nearer said second driving surface than a plane containing each of said first axes.

7. The friction clutch of claim 1 wherein said spring means comprises a single Belleville spring.

* * * * *

UNITED STATES PATENT OFFICE
CERTIFICATE OF CORRECTION

Patent No. 4,026,400　　　　　　　　　　Dated　　May 31, 1977

Inventor(s) Dennis George Rawlings

It is certified that error appears in the above-identified patent and that said Letters Patent are hereby corrected as shown below:

On the Title Page, Item /73/ should read:
--Automotive Products Limited--.

Signed and Sealed this

Twenty-eighth Day of February 1978

[SEAL]

Attest:

RUTH C. MASON　　　　　　　　　　LUTRELLE F. PARKER
Attesting Officer　　　　　Acting Commissioner of Patents and Trademark